United States Patent [19]

Poggi et al.

[11] Patent Number: 5,640,940

[45] Date of Patent: Jun. 24, 1997

[54] SYSTEM FOR REDUCING THE PHENOMENA OF DETONATION IN A COMBUSTION CHAMBER OF AN INTERNAL-COMBUSTION ENGINE

[75] Inventors: Pierluigi Poggi, Bologna; Michele Pennese, Medicina, both of Italy

[73] Assignee: Magneti Marelli S.p.A., Milan, Italy

[21] Appl. No.: 450,263

[22] Filed: May 25, 1995

[30] Foreign Application Priority Data

May 27, 1994 [IT] Italy .................. BO94A0248

[51] Int. Cl.⁶ ........................................... F02M 7/00
[52] U.S. Cl. ........................................... 123/435
[58] Field of Search ............................. 123/435, 571, 123/422, 493, 568, 425; 364/431.08, 431.04; 73/115, 117.3, 35

[56] References Cited

U.S. PATENT DOCUMENTS

| 2,220,558 | 11/1940 | Van Dijck et al. | 123/435 |
|---|---|---|---|
| 2,403,774 | 7/1946 | Whitty et al. | 123/435 |
| 2,467,732 | 4/1949 | Davis | 123/435 |
| 4,243,009 | 1/1981 | Staerzl | 123/435 |
| 4,364,353 | 12/1982 | Fiala | 123/425 |
| 4,393,687 | 7/1983 | Müller et al. | 123/435 |
| 4,721,089 | 1/1988 | Currie et al. | 123/571 |
| 4,944,271 | 7/1990 | Iwata et al. | 123/435 |
| 4,951,630 | 8/1990 | Iwata | 123/435 |
| 5,027,775 | 7/1991 | Iwata | 123/425 |
| 5,052,214 | 10/1991 | Dils | 73/35 |
| 5,276,625 | 1/1994 | Nakaniwa | 364/431.08 |
| 5,323,748 | 6/1994 | Foster et al. | 123/435 |

FOREIGN PATENT DOCUMENTS

| 0040814 | 12/1981 | European Pat. Off. | 123/435 |
|---|---|---|---|
| 0397174 | 11/1990 | European Pat. Off. | 123/435 |
| 0420303 | 4/1991 | European Pat. Off. | 123/435 |
| 0431393 | 6/1991 | European Pat. Off. | 123/435 |
| 2500061 | 2/1982 | France | 123/435 |
| 2500066 | 2/1982 | France | 123/435 |
| 3103861 | 9/1982 | Germany . | |
| 60-056150 | 4/1985 | Japan | 123/435 |
| 61-046446 | 3/1986 | Japan | 123/435 |
| 62-251451 | 11/1987 | Japan | 123/435 |
| 63-143360 | 6/1988 | Japan | 123/435 |
| 609309 | 3/1944 | United Kingdom | 123/435 |
| 2098756 | 11/1982 | United Kingdom | 123/435 |

OTHER PUBLICATIONS

Research Disclosure, No. 342, Oct. 1992.
European Search Report, Dated Jun. 20, 1996, Appl. No. 95 10 8131.

*Primary Examiner*—Raymond A. Nelli
*Attorney, Agent, or Firm*—Myers Liniak & Berenato

[57] ABSTRACT

The system is used to reduce the possibility of re-creating the conditions in which the phenomenon of detonation is triggered in a combustion chamber of an internal-combustion engine of a power unit which comprises an air inlet manifold, a plurality of cylinders, and an electronic ignition and injection system.

The system comprises:

means that sense the phenomenon of detonation;

means that vary the amount of air channelled towards the combustion chamber; and means connected to the sensing means, for controlling the means for varying the amount of air channelled towards the combustion chamber in order to reduce the possibility of re-creating the conditions in which detonation is triggered.

8 Claims, 2 Drawing Sheets

5,640,940

SYSTEM FOR REDUCING THE PHENOMENA OF DETONATION IN A COMBUSTION CHAMBER OF AN INTERNAL-COMBUSTION ENGINE

BACKGROUND OF THE INVENTION

The present invention relates to a system for reducing the phenomena of detonation in a combustion chamber of an internal-combustion engine.

It is known that detonation, that is an explosion in the form of abnormal combustion of the air-fuel mixture, will occur if there are elevated temperatures in particular hot spots of the chamber and if the internal pressure is at elevated levels. Detonation is very harmful as it produces high thermal and metallurgical fatigue of the material of the chamber and of the parts (such as the valves) installed in the combustion chamber.

SUMMARY OF THE INVENTION

It is an object of the present invention to provide a system which will enable the phenomena of detonation to be eliminated in order to avoid the problems cited above.

There is made, on the basis of the present invention, a system for reducing the phenomena of detonation in a combustion chamber of an internal-combustion engine of a power unit which comprises an air inlet manifold, a plurality of cylinders, an electronic ignition system, and an electronic injection system characterized in that it comprises:

means for sensing the phenomenon of detonation;

means for varying the amount of air channelled along said manifold towards said combustion chamber; and means, connected to said sensing means, for controlling said means for varying the amount of air channelled towards said combustion chamber in order to reduce the possibility of re-creating the conditions in which the phenomenon of detonation is triggered.

BRIEF DESCRIPTION OF THE DRAWINGS

In order to enable a better understanding of the present invention to be obtained, a preferred embodiment is now described, purely by way of a non-restricting example, with reference to the accompanying drawings, in which.

DETAILED DESCRIPTION OF THE INVENTION

Figure 1:
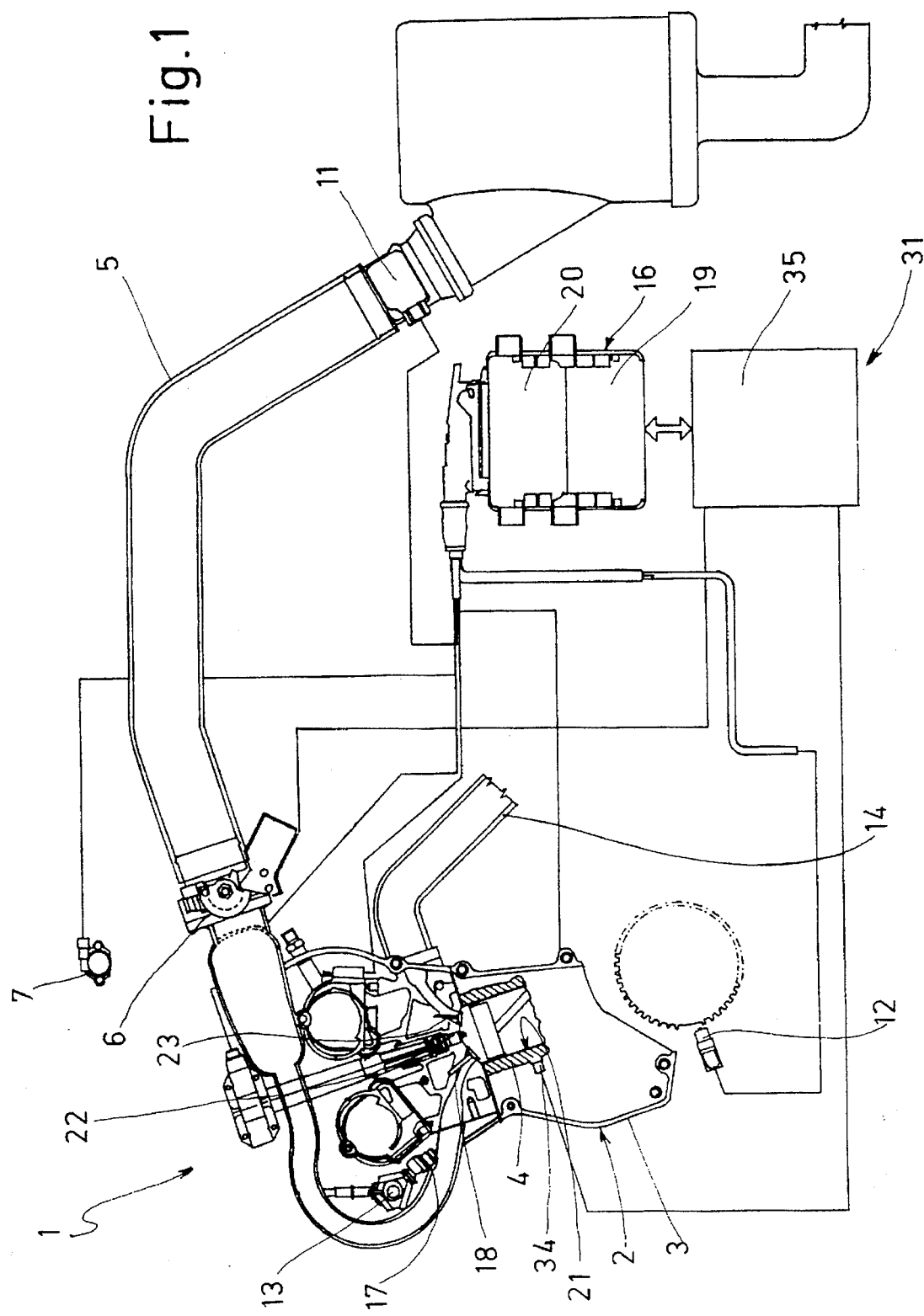
FIG. 1 is a schematic view of the system forming the subject of the present invention.

FIG. 1 partly illustrates a power unit indicated as a whole by the numeral 1 and comprising:

an internal-combustion engine 2 with a cylinder block 3 and a plurality of cylinders 4, only one of which is partly shown;

an air inlet manifold 5 fitted with a throttle body 6 for regulating the amount of air channelled towards the cylinders 4;

a sensor 7 able to sense the angular position of the throttle with which the body 6 is fitted;

a sensor 11 able to sense the rate of flow of the air drawn along the manifold 5;

a sensor 12 able to sense the engine speed;

a fuel manifold 13;

a pipe 14 for channelling the exhaust gases away from the cylinders 4; and an electronic control unit 16 to which the sensors 7, 11 and 12 are connected.

The control unit 16 is fitted with an electronic injection system 19 that controls electronic injectors 17, only one of which is shown, and these inject fuel from the fuel manifold 13 into the final portion of the air inlet manifold 5, where the air-fuel mixture is created. This final portion of the manifold 5 leads through an inlet valve 18 into the combustion chamber 21 defined by the cylinder 4. The control unit 16 is also fitted with an electronic ignition system 20 that controls the firing of the spark between the electrodes of spark plugs 22, these electrodes being positioned inside the combustion chamber 21 between the inlet valve 18 and an exhaust valve 23 through which the exhaust gases pass into the pipe 14.

With reference to FIG. 1, the numeral 31 indicates as a whole, a system that enables the phenomena of detonation, that can occur in the chamber 21 owing to abnormal combustion, to be reduced. The system 31, as will be seen more clearly below, prevents the re-creating of the conditions in which the phenomenon of detonation is triggered; these conditions are chiefly elevated temperature in certain points in the chamber 21 and elevated internal pressure. To prevent the phenomena of detonation from continuing, the system 31, having ascertained the occurrence of the phenomena of detonation, reduces the amount of air drawn into the cylinder 4. Consequently, in the interior of the combustion chamber 21, pressure and hence temperature is reduced. The reduction of these values prevents the re-creating of the conditions in which the phenomenon of detonation is triggered; these conditions being chiefly, as already stated, elevated temperature in certain points in the chamber 21 and elevated internal pressure.

The system 31 comprises a sensor 34 that senses detonation, and an electronic apparatus 35 to which the sensor 34 is connected and which sends a control signal, directly or through the control unit 16, to reduce the amount of air drawn in through the manifold 5. The apparatus 35 may form part of the control unit 16 or may be a separate apparatus, which however "communicates" with this control unit 16. The sensor 34, in a preferred embodiment depicted in FIG. 1, is mounted on one wall of the cylinder 4 and consists of an accelerometer able to sense the vibrations to which this wall of the cylinder 4 is subjected while the engine 2 is running. The intensity of the vibrations to which the cylinder 4 is subject is taken as an index of the phenomenon of detonation since experimental tests have demonstrated that when detonations are occurring, peak values of the intensity of the vibrations are found to occur at particular frequencies. The member that reduces the amount of air drawn in through the manifold 5 in the embodiment shown in FIG. 1 is formed by the throttle body 6, whereby, by mechanically or electronically (in the case of a motorized throttle body) controlling the position of the throttle, the amount of air drawn in can be regulated. Clearly, however, the system 31 may use a different device from the throttle body 6 for reducing the amount of air drawn in. After reducing the amount of air drawn in, it is possible by means of the system 19 to provide a corresponding reduction in the amount of fuel injected in order to maintain the same ratio in the air-fuel mixture, or else, again by means of the system 19, to maintain or vary the amount of fuel injected in order to vary the ratio of the air-fuel mixture.

Figure 2:
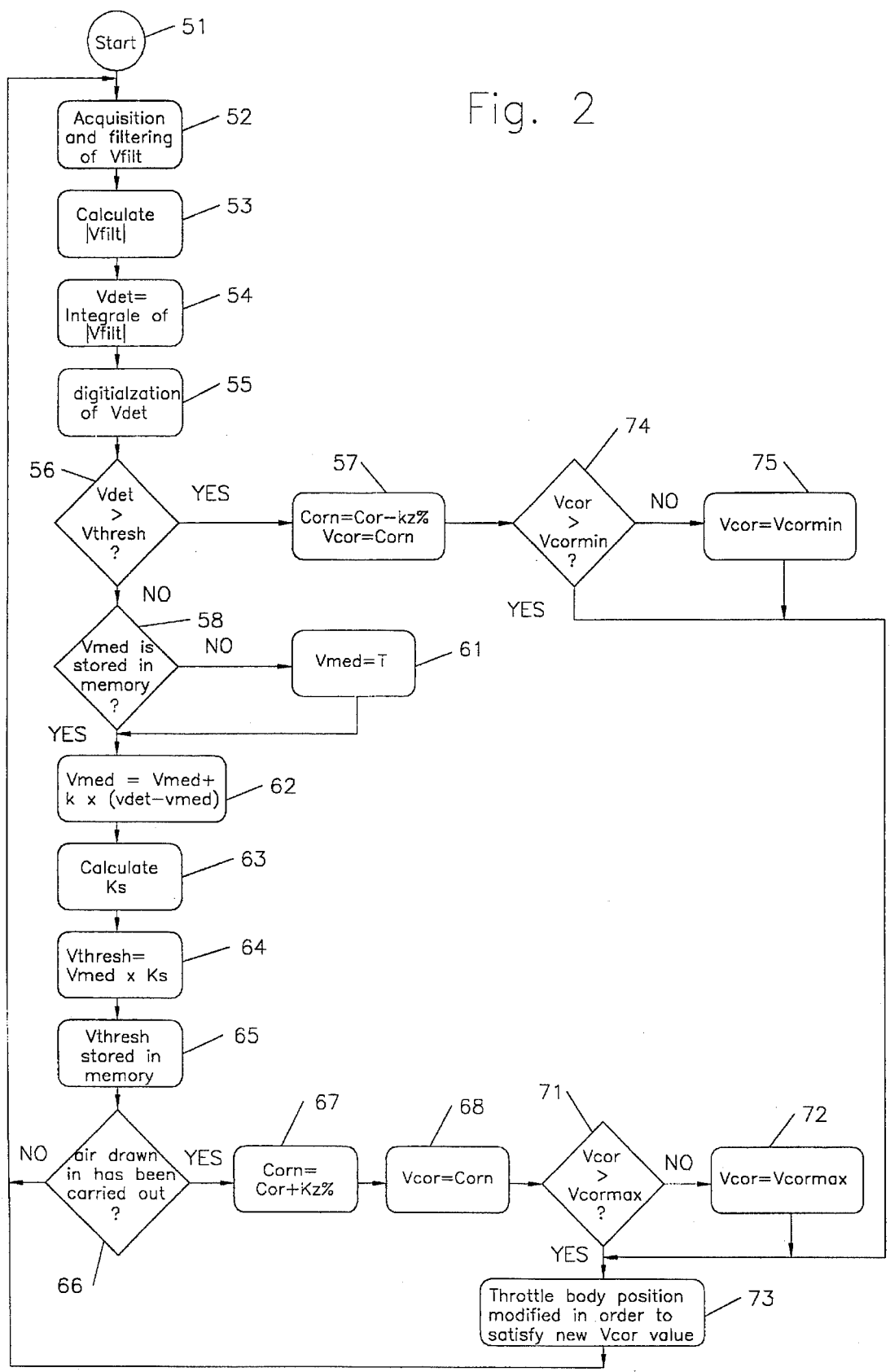
FIG. 2 shows the operating flow of the system depicted in FIG. 1.

The apparatus 35 controls the operation of the system 31 by following an operational flow shown in FIG. 2 and comprising a start block 51 followed by a block 52 in which the signals sent from the sensor 34 are filtered. This filtering takes the form of eliminating signals corresponding to vibrations that are considered typical of correct operation of the engine 2, that is of correct combustion of the air-fuel mixture. Basically, signals that fall outside a frequency band of predetermined width are eliminated, and only the signals +Vfilt and −Vfilt which in both positive and negative form are within this band are considered valid. After block 52 comes a block 53 in which the absolute value |Vfilt| of the signals +Vfilt and −Vfilt taken as valid in block 52 is calculated. After block 53 comes a block 54 in which the integral of the absolute values produced in block 53 between two angular positions of the crankshaft is calculated using the relationship $|Vfilt|d\sigma$, where $\sigma$ is the angle of the crankshaft. The integral is preferably calculated for a 90° rotation of the crankshaft from a predetermined point such as top dead centre. After block 54 comes a block 55 in which the value produced by the integration performed in block 54 is converted into a digital value Vdet.

After block 55 comes a block 56 in which the value Vdet is compared with a threshold value Vthresh. If the engine 2 is just starting up, the value Vthresh is assigned a predetermined value based on laboratory experiments. If the value Vdet is greater than the value Vthresh, it is assumed that detonation is occurring, and the unit therefore moves from block 56 to a block 57, whereas if the value Vdet is less than or equal to the value Vthresh it is assumed that detonation is not occurring, and the unit therefore moves from block 56 to a block 58.

In block 58 it is decided whether the engine 2 is in its starting cycle, i.e. whether a value Vmed is stored in a memory block (not shown) in the apparatus 35. If the engine 2 is in its starting cycle, the unit moves from block 58 to a block 61, whereas if it is not, it moves from block 58 to a block 62. In block 61, Vmed is made equal to T, where T is a predetermined value decided on the basis of laboratory experiments. From block 61 the unit moves to block 62 in which a new value is calculated for Vmed, which can be denoted Vmedn, using the relationship Vmedn=Vmed+Kx (Vdet−Vmed) in which Vmed relates to the previous cycle and K is a predetermined constant. Naturally, in the case of the starting cycle, the value set in block 61 is adopted as the value Vmed. Still in block 62, but after the calculation of Vmedn, it is assumed that Vmed=Vmedn so as to use the new Vmed value in the next operating cycle.

From block 62 the unit passes to block 63 where the value Ks is calculated on the basis of a relationship that takes into account the engine speed and engine load and, in essence, the conditions of the engine. These data are collected by the control unit 16 which, as is known, performs a whole series of calculations on the measurements provided by the sensors described earlier, and is capable of supplying all the information available therein on request. From block 63, the unit moves to a block 64 in which, using the relationship Vthresh VmedxKs, a new threshold value Vthresh is calculated. From block 64, the unit passes to a block 65 in which the value Vthresh calculated in block 64 is stored and this value Vthresh replaces, in block 56, the previous threshold value. From block 65 the unit moves to a block 66 in which it is determined whether or not a correction is being applied to the air channelled towards the chamber 21. Basically, in block 66 it is determined whether or not the command to the throttle body 6 to reduce the amount of air drawn in has been carried out. If a correction is being applied, the unit moves from block 66 to a block 67, whereas if the opposite is the case it returns from block 66 to block 52.

In block 67 the amount of air to be introduced into the chamber 21 is calculated according to the relationship Corn=Cor+Kzn %. The value Cor relates to the amount of air currently being introduced into the chamber 21, while the value Kzn % is a percentage value derived from laboratory experiments, which is added to the value Cor so as to define a new value for Cor called Corn relating to an amount of air greater than the amount of air currently being introduced into the chamber 21 and calculated in an earlier cycle in the operating flow. Basically, once it has been ascertained in block 56 that detonation is not occurring and in block 66 that a correction is still being applied, the amount of air to be introduced into the chamber 21 is gradually (+Kzn %) increased, cycle by cycle. From block 67, the unit moves to a block 68 in which the value Corn that has just been calculated is adopted and stored as the new value Vcor so that in the next cycle the value Kzn % can be added to the new value Vcor.

From block 68, the unit then moves to a block 71 in which the new value Vcor is compared with Vcormax, which is a predetermined stored value dependent on the maximum rate of flow of air that can be channelled through the manifold 5, this being a maximum flowrate corresponding to the position of maximum opening of the throttle of the body 6. If the new value Vcor is less than or equal to Vcormax, the unit moves from block 71 to a block 72, whereas if the opposite is the case it moves from block 71 to a block 73. Basically, in block 71 it is decided whether or not, after a series of cycles in each of which, owing to the continued absence of detonation, the amount of air introduced into the chamber 21 has been gradually increased, a new value Vcor equal to or less than Vcormax has been calculated, the new value Vcor corresponding to the position of maximum opening of the throttle of the body 6. In block 72 the value Vcor is made equal to Vcormax because the correction has been completed. The unit then passes from block 72 to block 73, in which the control signal to the throttle body 6 is carried out in order to set the channelling of air at a quantity equal to the new value Vcor decided in block 67, in block 72 or in other blocks which will be described below. Lastly, the unit moves from block 73 to block 52.

As already indicated, the unit moves from block 56 to block 57 if detonation is occurring or continuing to occur. In block 57 the amount of air to be introduced into the chamber 21 is calculated according to the relationship Corn=Cor−Kz %. The value Cor relates to the amount of air currently being introduced into the chamber 21, while the value Kz % is a percentage value derived from laboratory experiments, which is subtracted from the value Cor so as to define a new value for Cor called Corn relating to an amount of air less than the amount of air currently being introduced into the chamber 21 and calculated in an earlier cycle in the operating flow. Basically, once it has been ascertained in block 56 that detonation is continuing to occur, the amount of air to be introduced into the chamber 21 is gradually (−Kz %) decreased, cycle by cycle. After calculating the value Vcorn, still in block 57, the value Vcorn that has just been calculated is adopted and stored as the new value Vcor so that in the next cycle the value Kz % can be subtracted from the new value Vcor.

From block 57 the unit moves to a block 74 in which the new value Vcor is compared with a predetermined stored value Vcormin relating to a minimum value of the amount of air which it is possible to introduce into the chamber 21. This minimum value may depend, for example, on the rate of flow of the air channelled through the manifold 5 when the engine is idling, that is when the throttle of the body 6 is in the position of maximum closure. Should the new value Vcor be less than or equal to the value Vcormin, it moves from block 74 to a block 75 and from this to block 73, whereas should this not be the case it moves from block 74 directly to block 73. Basically, in block 74 it is determined whether or not, after a series of cycles in each of which, owing to continued detonations, the amount of air introduced into the chamber 21 has been gradually decreased, a new value has been calculated for Vcor, equal to or less than the value Vcormin corresponding to the minimum amount of air which it is possible to introduce into the chamber 21 while maintaining a predetermined engine speed. In block 75 the value Vcor is made equal to Vcormin, because beyond this limit it is not possible to decrease the amount of air introduced into the chamber 21. Clearly, the values Vcormax and Vcormin can be related to the speed at which the engine 2 was turning when detonation first occurred, in other words they may be related to the angular position of the throttle of the body 6 when detonation first occurred.

The advantages achieved by carrying out the present invention will be obvious from the above account.

In particular a system has been provided which, if it is ascertained that detonation is occurring, varies, according to a predetermined algorithm, the amount of air to be channelled towards the combustion chamber and which then, if it is ascertained that there is no continuation of detonation, increases, according to a predetermined algorithm, the amount of air to be introduced into the combustion chamber. As will be obvious, reducing the possibility of re-creating the conditions in which the phenomenon of detonation is triggered, relieves from excessive thermal and metallurgical fatigue the material of the combustion chamber and of the members installed in it. Also to be emphasized is the constructional simplicity of the system of the present invention—a constructional simplicity which will help to keep production costs down.

It will moreover be clear that the system 31 here described and illustrated may be modified and varied without thereby departing from the protective scope of the present invention.

In particular, the algorithm used to determine the amount and/or to vary the amount of air channelled through the air inlet manifold may differ from that described with reference to FIG. 2. For example, when detonation is first sensed, independently of the possible continuation of detonations, it is possible to predetermine an amount of air to be introduced over a predetermined period of time or an amount of air that decreases over a predetermined period of time according to a predetermined pattern. The amount of air may be the same for all cylinders of the engine, or a different amount of air may be sent to each cylinder; in this case each cylinder may be fitted with its own detonation sensor. The duration of the correction process may be related to the continuation of the detonation and/or to the engine conditions of the power unit such as engine speed, engine load, temperature of in-drawn air, etc. It is then possible to equip the power unit with a device by means of which the user can control the correction and with an apparatus capable of recording a series of engine parameters measured before, during and after the correction in order that these parameters can be processed and a diagnosis of the power unit drawn up.

As an alternative to the throttle body 6, it is possible to use a different air-intercepting device, such as, for example, an on-off shutter device, or a shutter device with proportional control. Also, as an alternative to the body 6, it is possible to install a battery of intercepting devices each strictly dedicated to a corresponding cylinder. Lastly, as an alternative to the body 6, it is possible to install an intercepting device with pneumatic, mechanical, magnetic or optical control.

The means for sensing detonation may take the form of a single sensor 34 fitted to one cylinder or to the cylinder block, or may take the form of a plurality of sensors 34, each fitted to its own cylinder. The sensing means may take the form of one or more sensors of a type different from that described. For example the sensor 34 may take the form of a pressure sensor installed in one or more combustion chambers, an acoustic sensor that senses the sound waves generated by the power unit, a member that analyses the composition of the combustion products, a member that analyses the thermal and/or kinematic state of the combustion products, or members such as load cells fitted to components of the power unit which sense the vibrations of the engine structure.

We claim:

1. A method for reducing the phenomena of detonation in a combustion chamber of an internal combustion engine of a power unit, the method comprising the following steps:

recognizing a signal generated by the phenomena of detonation;

processing the signal relating to the detonation;

comparing the result from said processing of the signal relating to the detonation with a predetermined threshold value above which a control signal is sent to reduce the amount of air channeled in to the chamber;

reducing the amount of air channeled into the chamber when the signal is determined to be above the threshold value; and progressively increasing the amount of air sent into said combustion chamber if there is no continuation of detonation until air conditions selected by a driver are reached.

2. The method according to claim 1, wherein when the detonation continues a control signal is generated in order to progressively decrease the amount of air sent into said chamber until a minimum flow rate is reached.

3. The method according to claim 2, comprising the following steps:

(a) a first filtering step wherein the signal sent from a sensor is filtered;

(b) a second step wherein the integral $|Vfilt| \, d\sigma$ between two angular positions of a crankshaft of the engine is calculated, where $\sigma$ is the angle of rotation of the crankshaft;

(c) a third step of converting to digital the value calculated at point (b) into a digital value $V_{det}$;

(d) a fourth step wherein the value $V_{det}$ is compared with a threshold value $V_{thresh}$; if the value $V_{det}$ is greater than the value $V_{thresh}$, it is assumed that detonation is occurring, whereas if the value $V_{det}$ is less than or equal to the value $V_{thresh}$ it is assumed that detonation is not occurring; and (e) a fifth step wherein, in the first case considered at point (d), when the detonation is occurring, the amount of air to be introduced into the combustion chamber is reduced cycle by cycle;

whereas in the second case considered at point (d), when there is no continuation of detonation, the amount of air sent into said combustion chamber is progressively increased until the air conditions selected by the driver are reached.

4. The method according to claim 3, wherein in the first case considered at point (d), when the detonation is occurring, the amount of air to be introduced into the combustion chamber is reduced cycle by cycle according to the relationship Corn=Cor−Kz %, the value Cor relating to the amount of air currently introduced into said combustion chamber, while the value Kz % is a percentage value derived from laboratory experiments which is subtracted from the value Cor so as to define a new value for Cor called Corn relating to an amount of air less than the amount of air currently being introduced into said combustion chamber and calculated in an earlier cycle in the operation flow.

5. The method according to claim 3, wherein in the second case considered at point (d), when the detonation is not occurring, a new threshold value $V_{thresh}$ is calculated using the relationship $V_{thresh}=V_{med} \times K_s$ where the value $K_s$ is defined on the basis of the conditions of the engine, the new value $V_{thresh}$ is stored and replaces the previous threshold value; the amount of air to be introduced into said combustion chamber being calculated according to the relationship Corn=Cor+Kzn %, where value Cor relates to the amount of air currently being introduced into said combustion chamber and value Kzn % is a percentage value derived from laboratory experiment which is added to the value Cor so as to define a new value for Cor called Corn relating to an amount of air greater than the amount of air currently being introduced into the combustion chamber and calculated in an earlier cycle in the operation flow; thus the amount of air sent into said combustion chamber being progressively increased until the air conditions selected by the driver are reached.

6. The method according to claim 3, wherein the new value $V_{cor}$ is compared with a predetermined stored value $V_{cormin}$ relating to a minimum value of the amount of air which it is possible to introduce into said combustion chamber, said minimum value depending on the rate of flow of the air channeled when the engine is idling.

7. An apparatus for reducing the phenomena of detonation in a combustion engine (2) of a power unit (1) which comprises an air inlet manifold (5), an electronic ignition system (20), and an electronic injection system (19), said apparatus comprising:

sensor means (34) for sensing a phenomenon of detonation;

processing, comparison, and throttle means (6) for varying the amount of air channelled along said manifold (5) towards said combustion chamber (21);

means (35), connected to said sensor means (34), for controlling said means (6) for reducing the amount of air channelled towards said combustion chamber (21) in order to reduce the possibility of recreating the conditions in which the phenomenon of detonation is triggered, and when it is determined that there is no continuation of detonation, progressively increasing the amount of air sent into said combustion chamber (21) until air conditions selected by a driver are reached.

8. A method for reducing the chance of detonation occurring in a combustion chamber of an internal combustion engine, the method comprising the steps of:

identifying or recognizing a signal generated as a result of detonation in an internal combustion chamber;

filtering the signal for the purpose of eliminating signals corresponding to vibrations that are considered typical of correct engine operation;

integrating the filtered signal;

following said integrating, converting the integrated signal into a digital signal;

comparing the digitized signal with a threshold value to determine if detonation is occurring;

when it is determined that detonation is occurring, calculating an amount of air to be introduced into the combustion chamber and introducing same into the chamber;

gradually decreasing the amount of air introduced into the chamber when detonations continue; and progressively increasing the amount of air introduced into the combustion chamber when it is determined that detonation has discontinued until air conditions selected by a driver are met.

* * * * *